Aug. 6, 1940.     W. E. HUMPHREY     2,210,081
FLUID FLOW METER
Filed July 27, 1938

INVENTOR
WALTER E. HUMPHREY
BY
ATTORNEYS

Patented Aug. 6, 1940

2,210,081

UNITED STATES PATENT OFFICE 2,210,081

FLUID FLOW METER

Walter E. Humphrey, Jeannette, Pa.

Application July 27, 1938, Serial No. 221,548

4 Claims. (Cl. 73—208)

The present invention relates to apparatus for measuring the rate and volume of flow of a fluid, and while it is particularly designed and intended for use in connection with circulatory lubrication systems, it may have further and more extended application.

So far as known to me, there is no satisfactory device for use in circulatory lubricating systems by which the attendant may be assured that individual machines in the system are securing any or adequate flow of oil. My device supplies this want for it gives a satisfactory device by which the fact that oil is flowing to a certain machine and the extent of flow can be accurately and readily determined at all times. It is also possible with the use of the invention to regulate accurately the amount of oil which is being supplied to any machine.

At times it may be necessary to flood the bearings in any particular machine and my device makes provision for such cases, it being possible to provide for a greatly increased flow which will flush out the bearings to correct any local disturbance in the lubricating system.

The advantages of the device shown and described herein lie in its simplicity of construction and operation, the accuracy with which the instrument indicates the amount of oil flowing to any machine, and the ability to secure temporary flooding condition whenever such operation is required.

In the drawing there is illustrated one form or embodiment of the invention which is the best known and preferred form of the device, but changes and modifications may be made in the apparatus without sacrificing the benefits of the invention.

Figure 1:
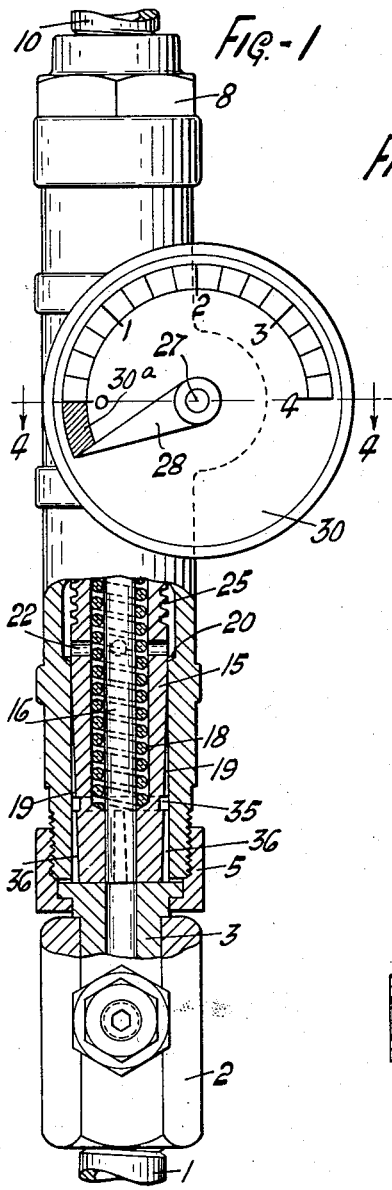
Fig. 1 is a side elevation of the preferred form of flow meter, the lower portion of the device being in section to show the internal construction. In this view the device is shown in its closed position when no oil is flowing.

The device, if used as an oil-flow indicator, is intended to be mounted in the feed line of a circulatory oiling system receiving its oil supply under pressure from any suitable manifold or feeding system and delivering the oil to the bearings of a machine. In installations where a large number of machines are located on a single pressure lubrication system, the supply pipe 1 may lead from a manifold to the inlet end of a valve block or coupling 2 in the opposite end of which is fitted the base 3 connected by a coupling 5 to the lower end of an elongated casing 6 containing the measuring and indicating devices.

The other end of the casing is fitted with a plug 8 having passages 9 and in which is threaded the outlet pipe 10 which leads directly to the machine to be lubricated. An adjustable valve 12 seated in the coupling 2 cooperates with the valve seat 14 to control the quantity of oil which will flow through the device.

The casing 6 is preferably tubular in form to provide an elongated passage through which the oil may pass to the machine to be lubricated. The lower portion of the passage is of somewhat smaller internal diameter than the upper portion of the passage, these two portions of the casing being connected by the rather abrupt shoulder 20 later to be described. The lower portion of the chamber is a substantially close fit about the regulating plunger so that the flow of oil is accurately governed and gauged by the distance to which the plunger is elevated, while the upper or enlarged bore secures a free flow of oil after it passes through the control device. When the plunger is elevated in such position that certain larger passages therein register with the enlarged bore the oil will flow in greater volume so that the bearings may be flooded.

It will be appreciated that the details of the parts which have just been given are by way of example only and are subject to changes and modifications.

The oil or other fluid which is being controlled and metered flows through the passage in the base into the lower end of the casing 6 where it contacts the lower end of a vertically moving plunger indicated as a whole by the numeral 15. This plunger is mounted upon the lower end of a long pin 16 which passes through the casing, being guided at its upper end in the plug 8. The center of the plunger is hollowed out to receive the coil spring 18 which yieldingly holds the lower end of the plunger against its seat in the base 3 when the valve is closed or when there is no pressure upon the oil line. It is apparent that with a given or uniform pressure upon the oil, the extent to which the plunger will rise is dependent upon the extent to which the valve 12 is opened. The height of the plunger, therefore, measures the amount of oil passing through the meter in a given time.

The sides of the plunger are provided with two vertical and preferably tapered grooves 19 which extend from the lowermost point in the plunger to a point slightly below an internal shoulder or enlargement 20 of the casing. As shown in Fig. 1, the plunger fits closely against the interior of the casing below the shoulder 20 and the grooves 19 terminate slightly below this point so that when the parts are in the position shown in this view no oil is passing through the meter, and no oil will pass through until the plunger is raised sufficiently to bring the upper ends of the grooves 19 above the shoulder 20.

Figure 3:
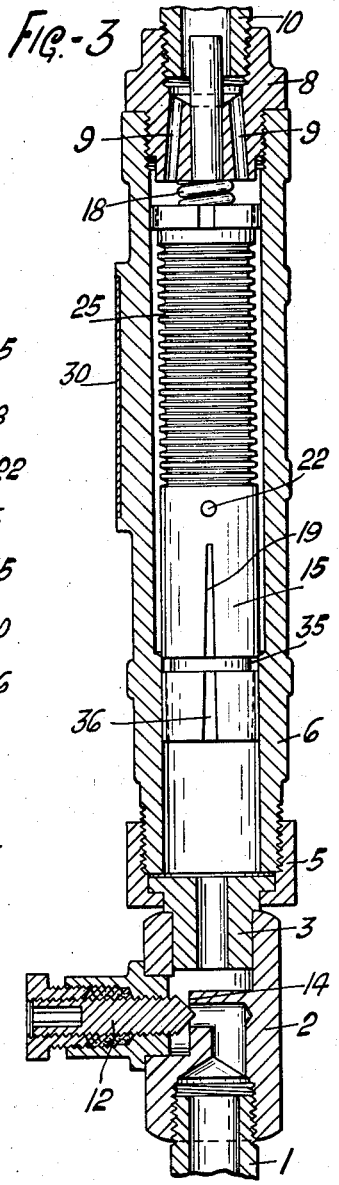
Fig. 3 is a view with the outer casing in section, showing a normal running or operating position with substantially the maximum normal flow.
Figure 4:
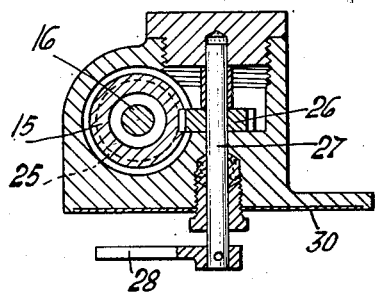
Fig. 4 is a section on the line 4—4 of Fig. 1.

In the position shown in Fig. 3, the maximum amount of oil is flowing through the device, short of the flood condition. As the oil passes into the enlarged bore of the casing above the shoulder 20, it may flow around the upper portion or body of the plunger and out through the passages 9 to the outlet pipe 10 and thence to the machine. In order to provide a fully unrestricted flow of oil, transverse passages 22 may lead from the exterior to the interior of the plunger by which the oil finds its way to the passages 9.

The outer and upper surface of the plunger 15 is provided with a rack 25 which meshes with a pinion 26 on a short shaft 27 in the side of the casing, the shaft being shown as carrying a pointer 28 moving over the face of a dial 30 which may be graduated in the manner shown in Fig. 1. Any other form of registering means may be employed. In the form shown in Fig. 1, the shaded portion 30ᵃ indicates the travel from the lowermost position of the plunger to the point where the grooves 19 reach the shoulder 20 and the oil starts to flow. The limit of the dial marking indicates the point shown in Fig. 3 when the maximum normal flow of oil is being secured. Beyond that point is found the flooding condition which may be used for emergencies only and is required when the bearings supplied through the meter require flushing.

It will be noted that immediately below the shoulder 20 when the plunger is in its extreme open operative position, the groove 35 is cut around the plunger and that between this groove and the base of the plunger additional grooves 36 are provided which, with the continuations of the grooves 19, give four grooves leading to the transverse groove 35.

Figure 2:
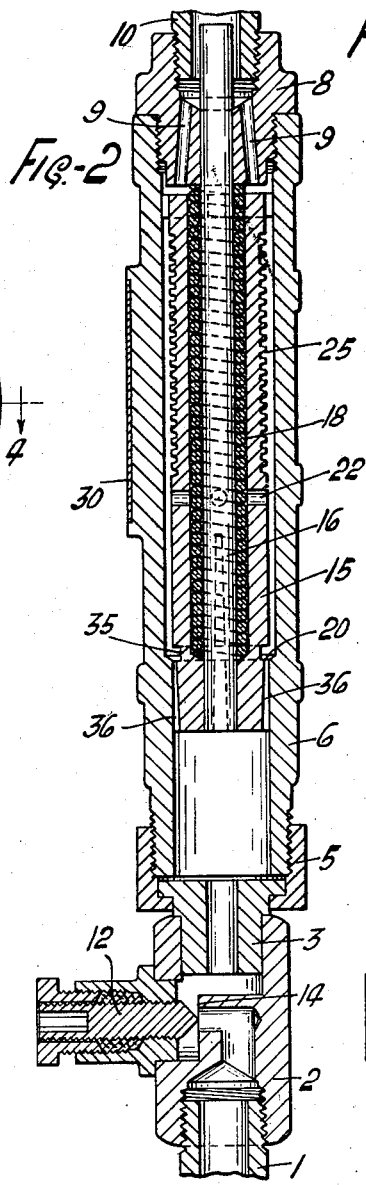
Fig. 2 is a section through the device showing the parts in the extreme or fully open position for flooding a bearing.

When it is desired to flood the bearings, the valve 12 is opened beyond any normal operating position, and the full pressure of oil admitted to the lower end of the casing raises the plunger to its fullest extent with the groove 35 in register with the shoulder 20, and a large supply of oil will pass through the casing and into the machine to be lubricated. This condition is illustrated in Fig. 2, by which it will be seen that the device may quickly be adjusted so as to permit the flooding for the purposes set forth.

The metering and controlling device shown here is simple, effective and accurate, requiring the minimum of operative parts. It gives a clear indication of the amount of oil passing into and out of the device and to the bearings so that the attendant may tell instantly how much oil is being supplied to any machine to which it is connected, and when the bearings in any machine become clogged or fouled so that less oil passes to them, the plunger will recede toward the zero reading. In this way the attendant may be informed at all times of the effective operation of the lubricating system. At the same time, by a simple adjustment of the control valve, the device will permit the flooding of a bearing if desired.

The description and drawing are not intended to restrict the invention beyond the fair scope of the claims, but are for the purpose only of illustrating the best known or preferred form of the invention. The location and construction of the valve 12 may be varied, it being essential only that the operator have means for controlling the amount of oil passing through the device.

What is claimed is:

1. In a device for metering the flow of oil in a circulatory lubricating system, the combination of a casing, inlet and outlet ports in the casing for the passage of oil therethrough, a yieldingly held plunger in the casing intermediate the inlet and outlet ports thereof, said plunger slidably fitting a portion of the casing but spaced from the walls thereof at another portion and movable by the pressure of oil thereon, tapered passages in that portion of the plunger that slidably fits the casing, said passages extending longitudinally from the end of the plunger, an enlarged circumferential passage in the plunger intersecting the tapered passages intermediate the ends thereof and so located as to be exposed to the interior of the casing when the plunger is moved to an extreme position, and other passages extending longitudinally from the end of the plunger and terminating in said circumferential groove.

2. A device for metering the flow of fluid in a circulatory lubricating system, said device comprising a tubular casing having an inlet at one end thereof and an outlet at the opposite end, said casing being of relatively small bore at the inlet end portion and of relatively large bore at the outlet end, a tubular plunger having a closed end portion that slidingly fits within the relatively small bore of the casing, said plunger being axially movable by pressure of fluid entering the casing, passages in the surface of the plunger adapted to pass fluid from the small bore of the casing into the large bore thereof upon axial movement of the plunger, circumferential rack teeth formed on that portion of the plunger normally disposed within the large bore of the casing, a pinion meshed with said rack, and a shaft supporting said pinion, said shaft extending through the casing to the exterior thereof.

3. A combination as defined in claim 2 including an axial guide rod mounted within the interior of the plunger and projecting from the open end thereof, said guide rod being slidable in the casing structure at the outlet end thereof.

4. A device for metering the flow of fluid in a circulatory lubricating system, said device comprising a tubular casing having an inlet at one end thereof and an outlet at the opposite end, said casing being of relatively small bore at the inlet end portion and relatively large bore at the outlet end, a tubular plunger having a closed end portion that slidingly fits within the relatively small bore of the casing, said plunger being axially movable by pressure of fluid entering the casing, passages in the surface of the plunger adapted to pass fluid from the small bore of the casing into the large bore thereof upon axial movement of the plunger, circumferential rack teeth formed on that portion of the plunger normally disposed within the large bore of the casing, a pinion engaged with said rack, a shaft supporting said pinion and extending through the casing to the exterior thereof, an axial guide rod mounted within the interior of the plunger and projecting from the open end thereof, said guide rod being slidable in the casing structure at its outlet end, and transverse passages formed in the plunger wall in the region thereof that normally is disposed in the large bore of the casing for facilitating the passage of fluid to the casing outlet.

WALTER E. HUMPHREY.